(No Model.) 3 Sheets—Sheet 2.
L. COOK.
BARB FENCE MACHINE.
No. 312,820. Patented Feb. 24, 1885.
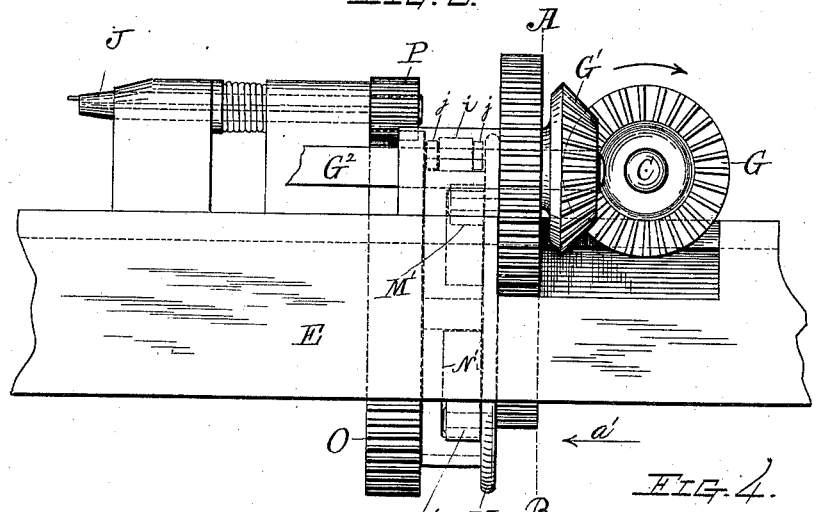
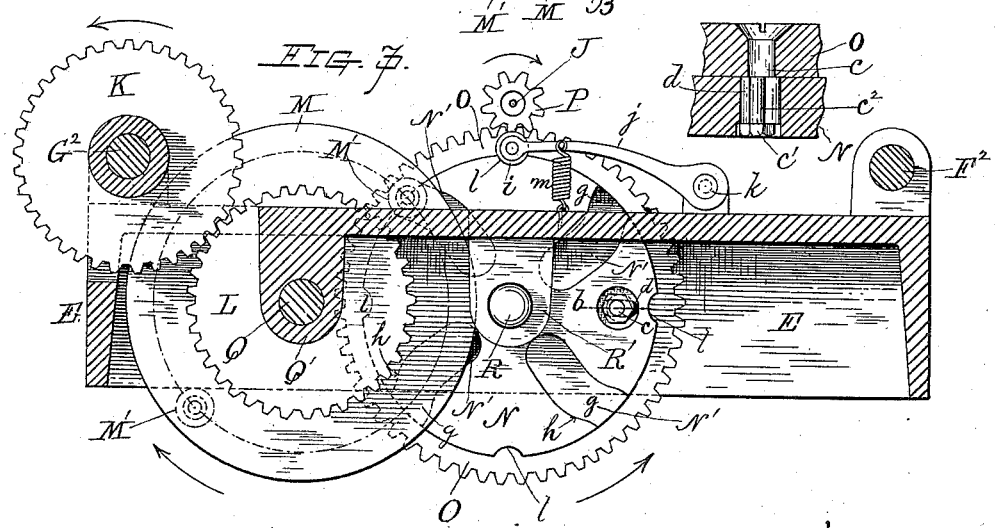
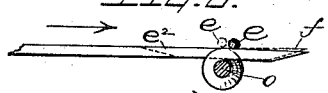
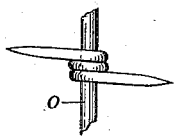
Witnesses:
Lucius W. Briggs
Walter B. Nourse
Inventor:
Leroy Cook
By Albert A. Barker
Attorney.

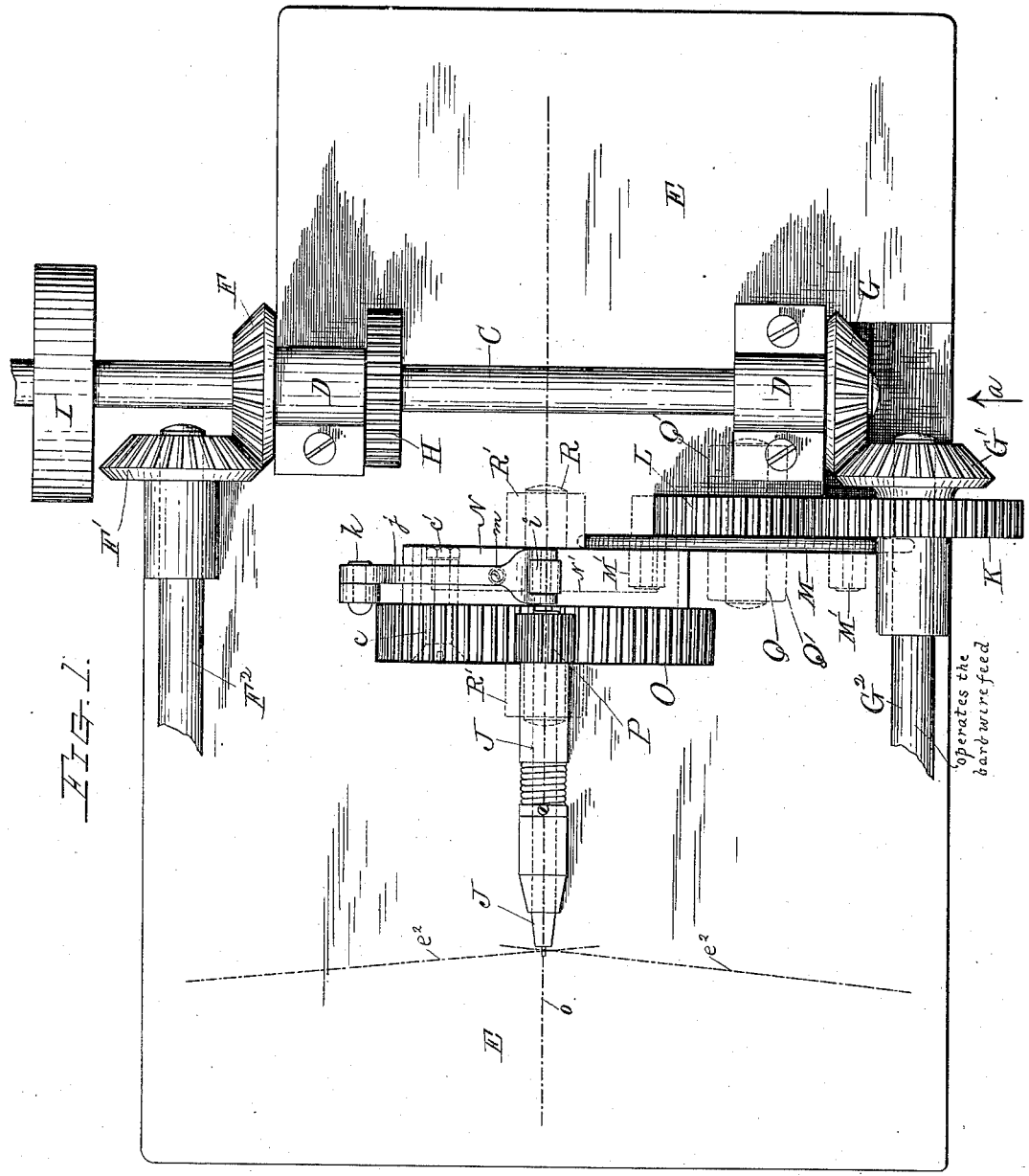

(No Model.)  
3 Sheets—Sheet 3.

L. COOK.
BARB FENCE MACHINE.

No. 312,820.  
Patented Feb. 24, 1885.

Witnesses:
Lucius W. Briggs
Walter B. Nourse

Inventor:
Leroy Cook
By Albert H. Baker
Attorney.

UNITED STATES PATENT OFFICE.

LEROY COOK, OF WORCESTER, MASSACHUSETTS.

BARB-FENCE MACHINE.

SPECIFICATION forming part of Letters Patent No. 312,820, dated February 24, 1885.

Application filed June 6, 1884. (No model.)

*To all whom it may concern:*

Be it known that I, LEROY COOK, of Worcester, in the county of Worcester and State of Massachusetts, have invented certain new and useful Improvements in Barb-Fence Machines; and I do hereby declare that the following is a full, clear, and exact description of the same, reference being had to the accompanying drawings, forming a part of this specification, and in which—

Figure 8:
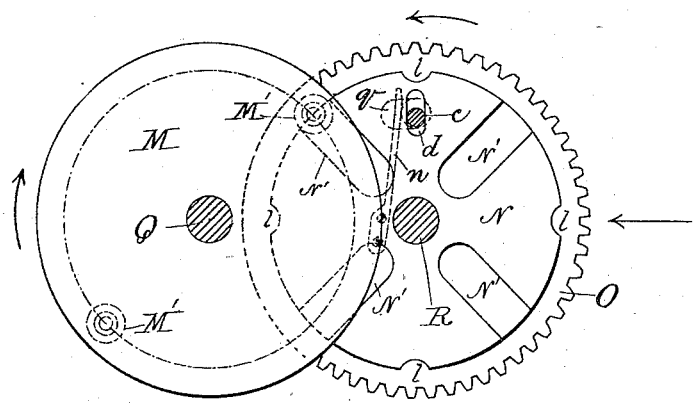
Figure 10:
Figure 9:
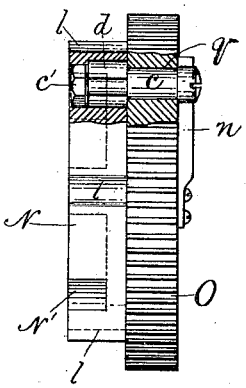
Figure 11:
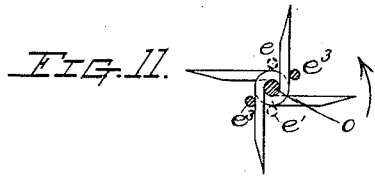
Figure 12:
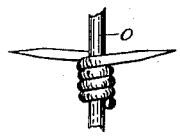

Figure 1 represents a top or plan view of so much of a barb-fence machine as is necessary to illustrate my improvements upon the same. Fig. 2 represents a side view of the parts shown in Fig. 1, looking in the direction of arrow $a$, same figure. Fig. 3 represents a vertical section through said parts, taken at the point indicated by the line A B, Fig. 2, looking in the direction of arrow $a'$, same figure. Fig. 4 represents a horizontal section taken on line $b$, Fig. 3. Figs. 5, 6, and 7 represent the winding-pin and wires in different positions occupied in winding the barb-wire around the main wire to form two-pointed barbed fence-wire, as hereinafter more fully described. Figs. 8 and 9 represent slight modifications to my improvements, necessitated in making four-pointed instead of two-pointed barbed fence-wire, which modifications will be hereinafter more fully explained; and Figs. 10, 11, and 12 represent the winding-pin and wires in different positions occupied in winding the barb-wire around the main wire to form four-pointed barbed fence-wire, as will also be hereinafter described.

My invention relates to that part of the mechanism of a barb-fence machine employed for operating the barb-winding spindle.

It consists in the construction and arrangement hereinafter described, whereby said barb-winding spindle is made to turn intermittingly in one direction to coil each succeeding barb-wire upon the main wire as they are fed into the machine from one or both sides of the same in making two-pointed or four-pointed barbed wire, as hereinafter described and claimed.

To enable those skilled in the art to which my invention belongs to make and use the same, I will proceed to describe it more in detail.

In the drawings, C represents the main driving-shaft of a barb-fence machine, which is arranged to turn in suitable bearings, D D, secured to the bed E. Upon said driving-shaft C are secured the bevel-gears F G, spur-gear H, and driving-pulley I, the latter in practice being connected with any suitable and convenient driving mechanism for operating the machine.

The spur-gear H is for the purpose of transmitting power from the main driving-shaft C to the mechanism for feeding the main wires forward. The bevel-gear F is for transmitting power through the bevel-gear F', shaft $F^2$, and other parts to feed the barb-wire forward on one side of the machine, when what is known as a "double-acting" machine is used. The bevel-gear G serves the same purpose as bevel-gear F for feeding through the bevel-gear G', shaft $G^2$, and other parts, the barb-wire upon the opposite side of a double-acting machine. It also serves the purpose of operating the mechanism for turning the barb-winding spindle J through the spur-gear K, fastened to shaft $G^2$, spur-gear L, circular disk M, provided with friction-rolls M' M', star-wheel N, provided with radial grooves or slots N', large spur-gear O, and pinion P, the latter being fastened to the inner end of the barb-winding spindle J. The circular disk M and spur-gear L are fastened together or formed in one part, and turn together on a journal, Q, supported in bearings Q' Q' formed upon or fastened to the under side of bed E. The star-wheel N and large spur-gear O also turn together upon a journal, R, supported in bearings R' R', also formed upon or fastened to the under side of bed E; but they are not rigidly fastened together. In this instance the two parts are locked together by means of a bolt, $c$, (see Figs. 3 and 4,) passed through said parts and held by a nut, $c'$, said nut being recessed into the star-wheel, so as not to interfere with the turning of the latter. The part $c^2$ of bolt $c$, which passes through the star-wheel N, is turned down smaller and made eccentric with the part which passes through the spur-gear O. A slot, $d$, is also formed in the star-wheel where the bolt passes through, for the purpose of admitting of a slight adjustment of the star-wheel to the spur-gear, when necessary, to obtain a proper action of the several parts in winding the barb-wire upon the main wire, as hereinafter described.

The friction-rolls M' M' on the circular disk M before referred to, are arranged equidistant upon opposite sides of the center of said disk, and the star-wheel N is provided with four grooves, N', in this instance. The distance between the centers of the friction-rolls M' is also made equal to the diameter of the star-wheel N, and said star-wheel and disk M are so arranged in relation to each other that as the latter revolves the friction-rolls will enter and leave the grooves N' when the latter are at an angle of forty-five degrees to the table E. Therefore for each quarter-revolution of the star-wheel the disk turns a quarter-revolution, and then turns another quarter-revolution before the other roll M' (if two are used) enters the upper groove to again turn the star-wheel.

In practice the parts are arranged so that each quarter-revolution turns the winding-spindle two and one-eighth revolutions—the distance required to put on each set of barbs. The barb-wire is coiled, when finished, only twice around the main wire; but in order that the barbs may project in the same direction, when completed, it is necessary to continue the bending operation one-eighth of a revolution farther, as aforesaid, and shown by full lines in Fig. 6, so that when the winding-pin e is turned back into its normal position, as shown by dotted lines in said Fig. 6, the spring of the wire will cause the barb to stand out straight upon a line with the one opposite, as shown by dotted lines f. The winding-spindle J and its pin e are made to turn back one-eighth of a revolution after each winding operation by forming slight curves g in the outer ends of the grooves or slots N', (formed in the star-wheel N,) where the friction-rolls enter and leave said grooves.

In entering the grooves no resistance is offered to the friction-rolls by contact with the star-wheel; but as said rolls pass out of the grooves they bear upon the curved sides h, and cause the star-wheel, and in consequence the winding-spindle J, to turn back one-eighth of a revolution, as before stated, said sides h being curved just sufficient to produce the above-described effect.

The star-wheel N is locked at each quarter-revolution after being turned back into its normal position, as shown in Fig. 3, by means of a friction-roll, i, mounted on the outer end of a lever, j, hinged at k, and held down in one of the recesses l, formed in the outer edge of the star-wheel, by means of a spiral spring, m, fastened at one end to said lever roll i and at its other end to bed E. The several parts are thus locked while the main wires are being fed forward preparatory to each barb coiling and cutting operation.

As the construction and arrangement of the barb-coiling spindle, and the mechanism for feeding the barb and main wires forward, and for cutting off the barb-wires to form the barbs are well known and constitute no part of my invention, a description of the same will be unnecessary.

If desired, any other equivalent device for locking the star-wheel at the completion of each quarter-revolution may be employed.

In making two-pointed barbed wire—such as represented in Figs. 5, 6, and 7—I am enabled to double the production of an ordinary single-acting machine having only one barb-feed mechanism and one set of cutters by simply doubling the cams for operating the movable cutter, and the main and barb wire feed mechanism, and applying my improvements hereinbefore described in place of the mechanism now employed for operating the barb-coiling spindle. Therefore it will be seen that any single-acting machine already made may, at a comparatively small expense, be readily converted into one whereby double the usual production is obtained. A single machine may thus be made to do an equal, if not greater, amount of work than a double machine, at a large saving in expense, and the wear and tear caused by the ordinary construction and arrangement are greatly lessened by the application of my improvements, which admit of a better balancing of the several parts.

A machine provided with my improvements may be run at a considerably higher rate of speed than one constructed in the old way. The parts, being few and simple, may be made strong and durable, and are therefore not liable to get out of repair or require renewal, except from long-continued usage. The wear to the star-wheel N is comparatively small, being distributed between four slots, N'.

A machine embracing my improvements may be employed not only for making two-pointed barbed wire, but also for making four-pointed barbed wire—such as shown in Figs. 10, 11, and 12—by using two barb-cutters and feeding two barb-wires in from opposite sides of the machine in the usual way, the only change in the barb-winding parts being those shown by the modifications in Figs. 8 and 9, which are as follows: The radial slots N' in the disk N are made straight instead of being curved at the ends, as before described; and in lieu of said curves I employ a spring, n, in this instance, to turn the spindle into its original position ready for the barb-wires to be fed forward, as represented in Fig. 10, one wire being fed over and the other under the main wire o, between the winding-pins e e'. Said spring n is fastened at one end to the large spur-gear O, and its outer end bears against the head of the bolt c, which head is extended out beyond the surface of the gear O for the above purpose, instead of being made flush with the same, as in a single-acting machine.

A slot, q, is made in the gear O, to admit of a slight circular movement of the winding spindle J independent of the friction-rolls M', as hereinafter more fully described.

I employ one winding-pin for two-pointed barbed wire, and two for four-pointed barbed wire, as in the old machines, the only difference I make in putting on the barbs being that I wind them all in one direction, as before described, thus causing them to project in one direction for either two or four pointed barbed wire.

By the use of the present style of machines which wind each succeeding barb-wire in opposite directions, each succeeding set of barbs must necessarily project in different directions, one-half being inclined toward the front and the other half toward the rear of the machine. In order to square them with the main wire, a device has to be used on the machine for that purpose, which by the use of my improvements may be dispensed with.

From the foregoing description, it will be seen that a machine provided with my improvements may be used for making either two-pointed or four-pointed barbed wire by merely changing the winding-pins and star-wheels, provided the gear O has a slot, $q$, made in the same, as before described, and shown in Fig. 8 of the drawings. Otherwise the machine would be precisely the same for making either kind of wire.

I am enabled by the application of my improvements not only to double the production of a single-acting machine used for making two-pointed barbed wire, but also to double the production of a double-acting machine used for making four-pointed barbed wire, as by the present method of making four-pointed barbed wire the coiling-spindle is operated in reverse directions for each succeeding set of barbs, and the motion of said coiling-spindle is utilized only in one direction.

The operations of winding the barb-wires to form two and four pointed barbed wire by a machine embracing my improvements may be briefly summed up thus:

In making two-pointed barbed wire the wire $e^2$ is first fed in, as before described. The winding-pin $e$ then begins to move in the direction shown by arrows, Figs. 5 and 6, being driven by the star-wheel N, as before described. It starts slowly, but increases in speed until the end of the first revolution, and then decreases to the end of the winding operation, which in practice consists of two and one-eighth revolutions, as before described. It is then moved back one-eighth of a revolution, into the position shown in Fig. 5 and by dotted lines in Fig. 6, for the purpose before stated.

In making four-pointed barbed wire the wires are first fed into the machine, as before described, when the winding-pins $e$ $e'$ then commence to move slowly in the direction shown by arrow, Fig. 11, until they strike the barb-wires; but the latter are not bent until the bolt $c$ in the star-wheel N strikes the end of slot $q$ in the large driving-gear O. The stiffness of spring $n$ not being sufficient to overcome the stiffness of the barb-wires, it is bent back. The motion of the winders $e$ $e'$ increases and decreases, as before described, until they reach the positions $e^3$ $e^3$, (shown by full lines in Fig. 11,) when they stop until the wires are cut off to form the barbs, and the main wire is fed forward, carrying the barbs with it. As soon as the barbs are moved away from the winders the latter are forced forward into their original positions, as shown by dotted lines in Fig. 11, by the spring $n$, pressing against the bolt in the star-wheel N. Therefore the winders make only two revolutions, the star-wheel causing the winders to make one and seven-eighths revolution to coil the barb-wire upon the main wire, and the spring completing the two revolutions, leaving said winders in position to feed the next succeeding barb-wires forward, as before described.

Having described my improvements in barb-fence machines, what I claim therein as new and of my invention, and desire to secure by Letters Patent, is—

1. In a barb-fence machine, a star-wheel N, in combination with means for operating the same, and the barb-winding spindle J, substantially as and for the purposes set forth.

2. The combination of the shaft $G^2$ with spur-gear K, secured on said shaft, spur-gear L, disk M, provided with one or more friction-rolls M', and fitted to turn with gear L in suitable bearings, large spur-gear O, star-wheel N, provided with grooves N' and recesses $l$, and arranged to turn in suitable bearings with gear O, locking-roll $i$, mounted on hinged lever $j$, and depressed or drawn down by spring $m$, and pinion P, fastened to the inner end of the barb-winding spindle J, all constructed and arranged to operate substantially as and for the purposes set forth.

3. The combination of the star-wheel N and means for operating the same with means for operating the barb-winding spindle from said star-wheel, substantially as shown and described.

4. The combination of the star-wheel N and means for operating it with the barb-winding spindle J and means for operating said spindle from the star-wheel, substantially as shown and described.

LEROY COOK.

Witnesses:
WALTER B. NOURSE,
ALBERT A. BARKER.